US012589413B2

(12) United States Patent
Takama

(10) Patent No.: US 12,589,413 B2
(45) Date of Patent: Mar. 31, 2026

(54) CLEANING DEVICE FOR EXTENSION ROLLER

(71) Applicant: RHEON AUTOMATIC MACHINERY CO., LTD., Tochigi (JP)

(72) Inventor: Akinori Takama, Tochigi (JP)

(73) Assignee: RHEON AUTOMATIC MACHINERY CO., LTD., Tochigi (JP)

( * ) Notice: Subject to any disclaimer, the term of this patent is extended or adjusted under 35 U.S.C. 154(b) by 270 days.

(21) Appl. No.: 18/288,276

(22) PCT Filed: Mar. 28, 2022

(86) PCT No.: PCT/JP2022/015147
§ 371 (c)(1),
(2) Date: Oct. 25, 2023

(87) PCT Pub. No.: WO2022/230543
PCT Pub. Date: Nov. 3, 2022

(65) Prior Publication Data
US 2024/0215589 A1 Jul. 4, 2024

(30) Foreign Application Priority Data

Apr. 28, 2021 (JP) ................................. 2021-075786

(51) Int. Cl.
*B08B 1/20* (2024.01)
*A21C 3/02* (2006.01)
*B08B 1/16* (2024.01)
(52) U.S. Cl.
CPC ................ *B08B 1/20* (2024.01); *A21C 3/027* (2013.01); *A21C 3/028* (2013.01); *B08B 1/16* (2024.01); *B08B 2220/01* (2013.01)

(58) Field of Classification Search
CPC ......... B65G 45/10; B65G 45/12; B65G 45/16
See application file for complete search history.

(56) References Cited

U.S. PATENT DOCUMENTS

| | | | | |
|---|---|---|---|---|
| 4,192,636 | A | | 3/1980 | Hayashi |
| 4,907,501 | A | * | 3/1990 | Rijkaart ................. A21C 3/022 |
| | | | | 425/96 |

(Continued)

FOREIGN PATENT DOCUMENTS

| | | |
|---|---|---|
| CN | 207414620 U | 5/2018 |
| CN | 104415927 B | 6/2019 |

(Continued)

OTHER PUBLICATIONS

Official Action/Search Report and Machine translation issued May 1, 2025 in Chinese Application No. 1 202280031073.X.

(Continued)

*Primary Examiner* — Omair Chaudhri
(74) *Attorney, Agent, or Firm* — Dilworth & Barrese, LLP

(57) ABSTRACT

A cleaning device for cleaning a surface of an extension roller of a dough extension apparatus includes a cleaning device body attached to the dough extension apparatus, and a band-like flexible cleaning member attached to the cleaning device body. The cleaning member includes ends and a cleaning portion with a cleaning surface. One end or both ends of the cleaning member is/are secured to the cleaning device body, and the cleaning portion hangs down, so that the cleaning surface of the cleaning portion is configured to contact the surface of the extension roller of the dough extension apparatus to be deformed and bent to correspond to the surface of the extension roller.

4 Claims, 8 Drawing Sheets

(56)         References Cited

U.S. PATENT DOCUMENTS

| | | | |
|---|---|---|---|
| 4,982,469 | A | 1/1991 | Nishiwaki |
| 5,150,650 | A | 9/1992 | Murakami |
| 5,888,573 | A | 3/1999 | Hayashi |
| 6,126,431 | A | 10/2000 | Hayashi |
| 6,155,814 | A | 12/2000 | Hayashi |
| 6,268,004 | B1 | 7/2001 | Hayashi |
| 2011/0111100 | A1* | 5/2011 | Ebata ........................ A21C 9/08 |
| | | | 99/489 |
| 2015/0059117 | A1* | 3/2015 | Kovacs .................. B65G 45/12 |
| | | | 29/428 |
| 2015/0128852 | A1 | 5/2015 | Sarajian |

FOREIGN PATENT DOCUMENTS

| | | | |
|---|---|---|---|
| CN | 112620192 | A | 4/2021 |
| JP | S495264 | B1 | 2/1974 |
| JP | S5225083 | A | 2/1977 |
| JP | S5938467 | U | 3/1984 |
| JP | H0527639 | A | 2/1993 |
| JP | S527639 | A | 2/1993 |
| JP | H09172938 | A | 7/1997 |
| JP | 2005348620 | A | 12/2005 |
| JP | 2009050229 | A | 3/2009 |

OTHER PUBLICATIONS

Extended European Search Report issued Oct. 10, 2024.
Official Action of Corresponding Taiwanese Patent Application
issued on Jul. 10, 2023.

\* cited by examiner

CLEANING DEVICE FOR EXTENSION ROLLER

TECHNICAL FIELD

The present invention relates to a cleaning device and a cleaning method for a surface of an extension roller in a food dough extension apparatus, and more particularly, to a cleaning device and a cleaning method for cleaning a surface of such an extension roller by removing adhering materials attaching to the surface.

BACKGROUND ART

Various proposals for a cleaning device for a surface of an extension roller have been made in a food dough extension apparatus. A device disclosed in the Patent Document 1 includes an adhering material removing means for removing adhering material on an outer peripheral surface of a pressing and extending roller for a noodle band in a noodle making machine, and an imaging means for imaging the outer peripheral surface of the pressing and extending roller. A device in a food dough extension apparatus disclosed in the Patent Document 2 includes rollers freely rotatably attached to shafts moving along an oval trajectory, and a conveyor which is disposed to face the oval trajectory and conveys dough.

PRIOR ART PUBLICATION

Patent Document 1: Japanese Patent Laid open Publication No. 2009-050229
Patent Document 2: Japanese Patent Laid-open Publication No. S 52-025083

SUMMARY OF THE INVENTION

Problem to be Solved by the Invention

In the device in the Patent Document 1, a position of a rotational axis of the pressing and extending roller is fixed, and the pressing and extending roller is concentric relative to the rotational axis, for which roller the adhering material removing means is used. Thus, there is a problem that such an adhering material removing means cannot remove adhering material adhering to an outer circumferential surface of the pressing and extending roller which roller is moved along a predetermined trajectory, which outer circumferential surface is eccentric relative to a rotating shaft, or which outer circumferential surface has non-constant radius from a center of a rotating shaft, namely, which outer circumferential surface is not circular, such as polygonal or elliptical. Further, in the extension apparatus described in Patent Document 2, a cleaning means is used to clean a surface of the roller by pressing a brush against the surface of the roller which is moved (circulated) along the oval trajectory, but there is a problem that the adhering material on the surface of the roller cannot be efficiently removed, and that it takes a lot of work to remove and clean the brush itself.

To solve the above-stated problem, an object of the present invention is to provide a cleaning device capable of efficiently removing adhering material on a surface of an extension roller in a food dough extension apparatus. Preferably, the object is to provide a cleaning device in which such a cleaning member can be easily removed and cleaned.

Means for Solving the Problem

The present invention is directed to a cleaning device for cleaning a surface of an extension roller in a dough extension apparatus, and the cleaning device includes a cleaning device body and a band-like cleaning member, wherein one end or both ends of the cleaning member is/are detachably secured to the cleaning device body so that a cleaning portion of the cleaning member hangs down, and the cleaning surface of the cleaning portion contact and cleans the surface of the extension roller.

Further, the cleaning member may be flexible, and the cleaning surface may be formed with convex concave features.

The cleaning device may also include a biasing member which biases the cleaning member from the opposite side from the cleaning surface and presses the cleaning surface against the surface of the extension roller.

Further, the extension roller may be configured to circulate along an oval trajectory.

Further, the extension roller may be configured to circulate along a circle trajectory.

Further, the extension roller may be configured to reciprocate along a predetermined trajectory.

The cleaning device may also include an extension roller rotating device which allows the extension roller to be rotated in at least a portion of a range in which the extension roller is moved along the trajectory in contact with the cleaning member.

Further, the extension roller may be an eccentric roller.

Further, the extension roller may be a polygonal roller.

In addition, the present invention is directed to a cleaning method for cleaning a surface of an extension roller in a dough extension apparatus includes a step of securing one or both ends of a band-like cleaning member to a cleaning device body to allow a cleaning portion of the cleaning member to hang down, and allow a cleaning surface of the cleaning portion to contact the surface of the extension roller to clean the surface of the extension roller.

Further, the cleaning member may be flexible, the cleaning surface may be formed with concave-convex features, and the cleaning surface of the cleaning member may be allowed to contact the surface of the extension roller to clean the surface.

Further, the flexible cleaning member including the cleaning surface with the concave-convex features may be allowed to be bent or deformed to correspond to and surface contact the surface of the extension roller to clean the surface.

Further, the cleaning device may include a biasing member which biases the cleaning member from the opposite side from the cleaning surface to press the cleaning surface against the surface of the extension roller.

According to the present invention, adhering material on the surface of the extension roller in the food dough extension apparatus can be efficiently removed. Further, with the cleaning member detachable, it is easy to attach, detach, and clean the cleaning member so that a work time for cleaning the extension device (apparatus) and the cleaning member can be shortened and a burden on an operator can be reduced.

DESCRIPTION OF EMBODIMENTS

Figure 1:
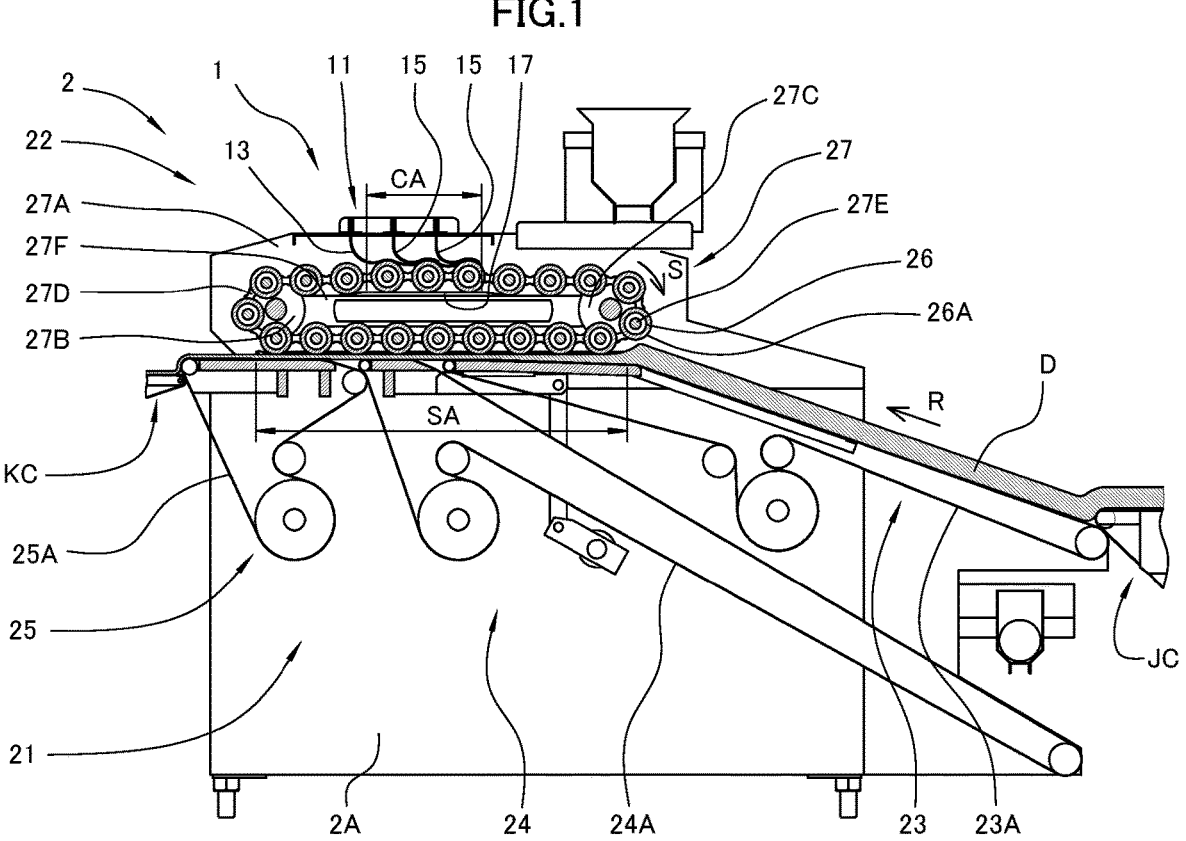
FIG. 1 is a schematic front cross-sectional view of a dough extension apparatus including a cleaning device according to the first embodiment of the present invention.
Figure 2:
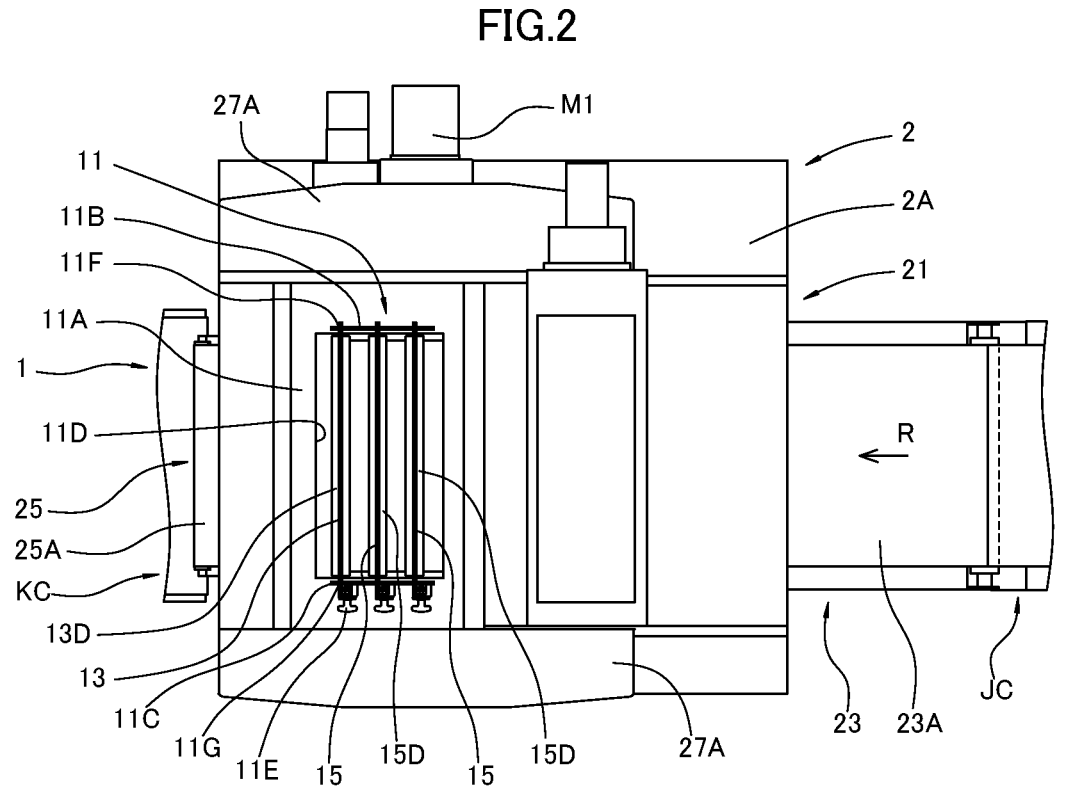
FIG. 2 is a schematic plan view of the dough extension apparatus of FIG. 1.
Figure 3:
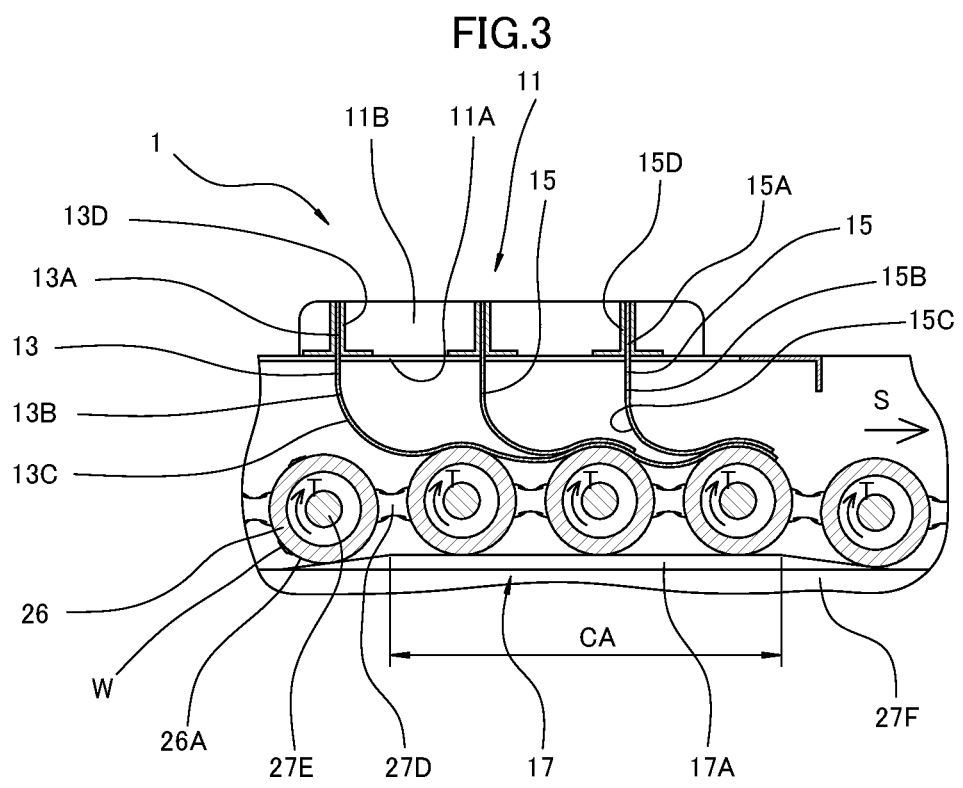
FIG. 3 is a schematic enlarged front cross-sectional view of a cleaning device according to a first embodiment of the present invention.

Referring to FIGS. 1-3, a cleaning device 1 according to a first embodiment of the present invention and a dough extension apparatus 2 including the cleaning device 1 will be explained. In the following explanation, detailed explanations of known components are omitted. The cleaning device 1 is configured to clean adhering material W adhering to surface 26A of an extension roller 26 in the dough extension apparatus 2 extending food dough D. In this description, the food dough D is explained as bread dough, and the adhering material W is explained as dough scraps of bread dough or powder dispersed on a surface of the dough.

As shown in FIGS. 1 and 2, the dough extension apparatus 2 is configured to extend the food dough D conveyed from an upstream conveyor JC and discharge the food dough D to a downstream conveyor KC, and includes a base frame 2A, a conveying device 21 attached to the base frame 2A, and an extending device 22 disposed above the conveying device 21.

The conveying device 21 includes a first conveyor 23 having an endless conveyor belt 23A, a second conveyor 24 disposed adjacent to and downstream of the first conveyor 23 and having an endless conveyor belt 24A, and a third conveyor 25 disposed adjacent to and downstream of the second conveyor 24 and having an endless conveyor belt 25A. Each of these three conveyors 23, 24, 25 has an opposed surface facing the extending device 22. Angles of the opposed surfaces of the first conveyor 23 and the second conveyor 24 are adjustable. The conveying device 21 is configured to convey the dough D in a conveying direction R shown in FIG. 1.

The extending device 22 includes a plurality of extension rollers 26 and an extension roller driving device 27 that allows the plurality of extension rollers 26 to be circulated (moved) along an endless oval trajectory in an arrow direction S shown in FIG. 1. The extension roller driving device 27 includes a pair of frames 27A, a pair of driving sprockets 27B, a pair of driven sprockets 27C, a pair of chains 27D, a plurality of extension roller shafts 27E, a pair of guide rails 27F for the extension rollers 26, and a driving motor M1.

The pair of frames 27A is disposed above the base frame 2A on opposite (left and right) sides of the conveying device 21. Inside of each of the paired frames 27A, the driving sprocket 27B, the driven sprocket 27C, and the guide rail 27F are disposed. The chain 27D is wound around the driving sprocket 27B and the driven sprocket 270 to form the oval trajectory for the extension rollers 26. Both ends of the extension roller shaft 27E are secured to the left and right chains 27D, respectively. The plurality of extension roller shafts 27E is secured to the chains 27D at predetermined intervals. The pair of driving sprockets 27B and the pair of driven sprockets 27C are attached (fitted) to a driving shaft and a driven shaft, respectively, and configured to integrally circulate (move) the pair (left and right) of chains 27D by the driving motor M1 connected to the driving shaft.

Each of the plurality of extension rollers 26 is rotatably supported (pivoted) on the extension roller shaft 27E and configured to be circulated (moved) along the oval trajectory of the chains 27D in the arrow direction S shown in FIG. 1. The extension rollers 26 are configured to extend the dough D between the extension rollers 26 and the opposed surfaces of the conveying device 21 when the extension rollers 26 are moved along a lower straight area (extending area SA) of the oval trajectory, and are configured to clean off the adhering material W adhering to surfaces 26A of the extension rollers 26 by the cleaning device 1 when the extension rollers 26 are moved along an upper straight area (cleaning area CA) of the oval trajectory.

As shown in FIGS. 1-3, the cleaning device 1 is disposed at an upper portion of the dough extension apparatus 2 and includes a cleaning device body 11, a cleaning member 13, a biasing member 15, and an extension roller rotating device 17.

As shown in FIG. 2, the cleaning device body 11 includes a base 11A and a pair of side plates 11B, 11C. The base 11A is a plate-like member extending (forming a bridge) between the paired frames 27A of the extending device 22 and is disposed at an upper-end of the extending device 22. The base 11A has (be formed with) at its center a rectangular aperture 11D. The side plates 11B, 11C are plate-like members disposed parallel to each other along the conveying direction R on an upper surface of the base 11A outside of the rectangular aperture 11D. Namely, the cleaning device 1 is disposed side by side with (corresponds to) the upper straight area of the oval trajectory along which the extension rollers 26 are circulated.

As shown in FIG. 3, the cleaning member 13 is a band like (sheet like) member and includes one end 13A in a longitudinal direction and a cleaning portion 13B which does not include the one end 13A. A material of the cleaning member 13 is preferably urethane with flexibility and elasticity. However, the material of the cleaning member 13 is not limited to this material and may be appropriately selected. The cleaning portion 13B includes a cleaning surface 13C contacting the surfaces 26A of the extension rollers 26. The cleaning surface 13C preferably has a concave-convex feature. The concave-convex feature of the cleaning surface 13C is preferably a configuration in which concave or recessed parts (grooves) are formed (engraved) in a lattice pattern, but the concave-convex parts are not limited to this configuration, and may be a configuration, for example, in which recessed parts are formed (engraved) in parallel or convex parts are pyramidal frustum or cone frustum. Configurations such as a shape, depth and width of the recessed parts, and configurations such as a shape and height of the convex parts may be appropriately selected according to conditions such as properties of the dough to be extended.

The one end 13A of the cleaning member 13 is secured to a plate 13D. The plate 13D is configured to be secured to the side plate 11C by a knob bolt 11E after one end of the plate 13D is inserted into an attachment aperture 11F of the side plate 11B and the other end of the plate 13D is inserted into an attachment slit 11G of the side plate 11C. The cleaning member 13 and the plate 13D can be integrally and detachably attached to the side plates 11B, 11C in an easy way by attaching/detaching the knob bolt 11E to/from the side plate 11C. Namely, the one end 13A of the band-like (sheet like) cleaning member 13 is configured to be detachably secured to the cleaning device body 11 via the plate 13D, the cleaning portion 13B is configured to hang down through the rectangular aperture 11D of the base 11A, and the cleaning surface 13C is configured to contact the surface 26A of the extension roller 26, so that the surface 26A of the extension roller 26 is cleaned. In FIG. 3, an example of the cleaning portion 13B contacting three consecutive extension rollers 26 is shown.

The biasing member 15 is configured to press the cleaning portion 13B of the cleaning member 13 against the surfaces 26A of the extension rollers 26 by biasing the cleaning portion 13B from an opposite side from the cleaning surface 13C. The biasing member 15 is a band like (sheet-like) and includes one end 15A in a longitudinal direction and a biasing portion 15B except for the one end 15A. A material of the biasing member 15 is preferably urethane with flexibility and elasticity. However, the material of the biasing member 15 is not limited to this material and may be appropriately selected.

The one end 15A of the biasing member 15 is secured to a plate 15D. The plate 15D is configured so that after one end of the plate 15D is inserted into another attachment aperture 11F of the side plate 11B and the other end of the plate 15D is inserted into another attachment slit 11G of the side plate 11C, the plate 15D is secured to the side plate 11C by another knob bolt 11E. The biasing member 15 and the plate 15D can be integrally and detachably attached to the side plates 11B, 11C in an easy way by attaching/detaching the knob bolt 11E to/from the side plate 11C. The biasing portion 15B includes a biasing surface 15C contacting the opposite side from the cleaning surface 13C (back side), and is configured to press the cleaning portion 13B against the surfaces 26A of the extension rollers 26. Namely, the one end 15A of the band-like (sheet like) biasing member 15 is configured to be detachably secured to the cleaning device body 11 via the plate 15D, and the biasing portion 15B is configured to hang down through the rectangular aperture 11D of the base 11A and bias the cleaning portion 13B from an opposite surface from the cleaning surface 13C (back surface), so that the cleaning surface 13C is configured to be pressed against the surfaces 26A of the extension rollers 26.

A way of attachment and detachment of the cleaning member 13 and the biasing member 15 is not limited to the above stated way, and, for example, a way of securing them by a toggle clamp may be employed, namely, a way for an operator to easily attach and detach them can be appropriately selected.

The flexibility of the cleaning member 13 can be changed by selecting its material and thickness, so that a bent amount of the cleaning member 13 to correspond to the surface 26A of the extension roller 26 and a strength with which the cleaning member 13 contacts the extension rollers 26 can be changed. Desirably, the plate 13D (or one end 13A of the cleaning member 13) is vertically secured to the cleaning device body 11. However, by changing a direction (angle) of the plate 13D to be secured, the strength with which the cleaning member 13 contacts the extension roller 26 may be changed. An example of two biasing members 15 disposed in the conveying direction is shown, but the number of the biasing members 15 is not limited to that in this example, or may be appropriately changed.

Further, the flexibility of the biasing member 15 can be changed by selecting its material and thickness, so that a strength with which the cleaning surface 13C of the cleaning portion 13B is pressed against the extension roller 26 can be changed. Also, the cleaning member 13 may be biased by a weight of the biasing portion 15B own.

The extension roller rotating device 17 is configured to rotate the extension roller 26 (on its own axis) while the extension roller 26 is moved in the cleaning area CA where the cleaning member 13 contacts the extension roller 26 to clean the surface 26A of the extension roller 26. The extension roller rotating device 17 includes a pair of friction plates 17A. The friction plate 17A has generally a rectangular solid shape with inclined surfaces at opposite ends in a longitudinal direction. The pair of friction plates 17A is disposed parallel to and along the conveying direction R on an upper surface of the pair of guide rails 27F at positions where the pair of friction plates 17A contacts the opposite ends of the extension roller 26. While the extension roller 26 is moved (revolved) in the arrow direction S shown in FIG. 3 in a region where the friction plates 17A are disposed, the opposite ends of the extension roller 26 contact the friction plates 17A so that the extension roller 26 is allowed to be rotated (on its own axis) in the arrow direction T shown in FIG. 3 with respect to the extension roller shaft 27E. To surely cause such a rotation on its own axis, namely, to increase a friction force between the extension roller 26 and the friction plate 17A more than that between the extension roller 26 and the cleaning member 13, the friction plate 17A is desirably formed of a material with a relatively large friction coefficient, such as a rubber.

The extension roller rotating device 17 is not limited to the above-stated configuration in the present embodiment, and it may employ rack gears instead of the rubber friction plates 17A, and gears attached to the opposite ends of the extension roller 26 so that the rack gears and the gears are mated with each other to rotate the extension roller 26 (on its own axis) moving in the cleaning area CA.

Preferably, an area in which the extension roller 26 is rotated (on their own axes) by the extension roller rotating device 17 is approximately the same as or longer than the cleaning area CA, but such an area is not limited to the preferable area, and it may be a portion of the cleaning area CA.

Next, an operation of the first embodiment will be explained. Continuous food dough D is conveyed to the dough extension apparatus 2 from a dough feeding apparatus (not shown) disposed on an upstream side of the dough extension apparatus 2. The food dough D is extended between the extension rollers 26 and the opposite surfaces of the conveying device 21 in the lower straight portion (extending area) SA of the oval trajectory and conveyed to a forming apparatus (not shown) disposed on a downstream side. Then, when the extension rollers 26 are rotating while they are moved in the upper straight portion (cleaning area) CA of the oval trajectory, the cleaning device 1 cleans the adhering material W adhering to the surfaces 26A of the extension rollers 26. At this time, the cleaning member 13 is deformed or bent to correspond to the surfaces 26A of the extension rollers 26, and the cleaning surface 13C surface-contacts upper portions of the surfaces 26A of the extension rollers 26.

By contacting the extension roller 26 with the upper surface of the friction plates 17A of the extension roller rotating device 17 while the extension roller 26 is moved in the arrow direction S by the extension roller driving device 27, the extension roller 26 is rotated in the arrow direction T shown in FIG. 3. Namely, the surface 26A is moved (revolved) and rotated (on its own axis) to slide on and surface contact the cleaning surface 13C, so that the cleaning surface 130 can clean the entire circumference of the surface 26A. Further, the cleaning surface 130 of the cleaning member 13 is biased from its back side against the extension roller 26 by the biasing member 15 to be strongly pressed against the surface 26A, so that the adhering material W can be efficiently cleaned over the circumference of the surface 26A. Further, since the friction plate 17A has the inclined surfaces on upstream and downstream sides in its moving direction (arrow direction S) of the extension roller 26, an impact and sound generation can be reduced when the extension roller 26 is moved from the guide rail 27F onto the friction plate 17A and from the friction plate 17A onto the guide rail 27F.

It was difficult for a conventional secured-type plate-like scraper to clean the entire circumference of the surface 26A of the moving extension roller 26. Further, even if a brush is used, the bristles of the brush could merely point contact the surface 26A of the extension roller 26, so that un-contacting portions cannot be cleaned and uneven cleaning is caused. Further, attachment and detachment operations and cleaning operation of the brush is time-consuming and are heavy burden on the operators. However, according to the configuration of the present invention, since the cleaning surface 13C of the cleaning member 13 surface-contacts the surface 26A of the extension roller 26 which is circulated (moved) along the oval trajectory, uneven cleaning is prevented and the adhering material W can be efficiently cleaned. Further, since the way of attaching and detaching the cleaning member 13 is easy and a way of cleaning the cleaning member 13 itself is easy, the burden on the operators can be reduced.

Next, referring to FIG. 4, a cleaning device 3 according to a second embodiment of the present invention and a dough extension apparatus 4 including the cleaning device 3 will be explained. The same reference numbers or characters as those of the components previously explained will be attached to components of the second embodiment which are the same as those previously explained, and duplicate explanation therefor is omitted. The cleaning device 3 is configured to clean adhering material W adhering to a surface 26A of an extension roller 26 in the dough extension apparatus 4 which extends the food dough D. In the dough extension apparatus 4 of the present embodiment, the extension rollers 26 are circulated (moved) along a circular trajectory, while in the dough extension apparatus 2 of the first embodiment, the extension rollers 26 are circulated (moved) along the oval trajectory.

Figure 4:
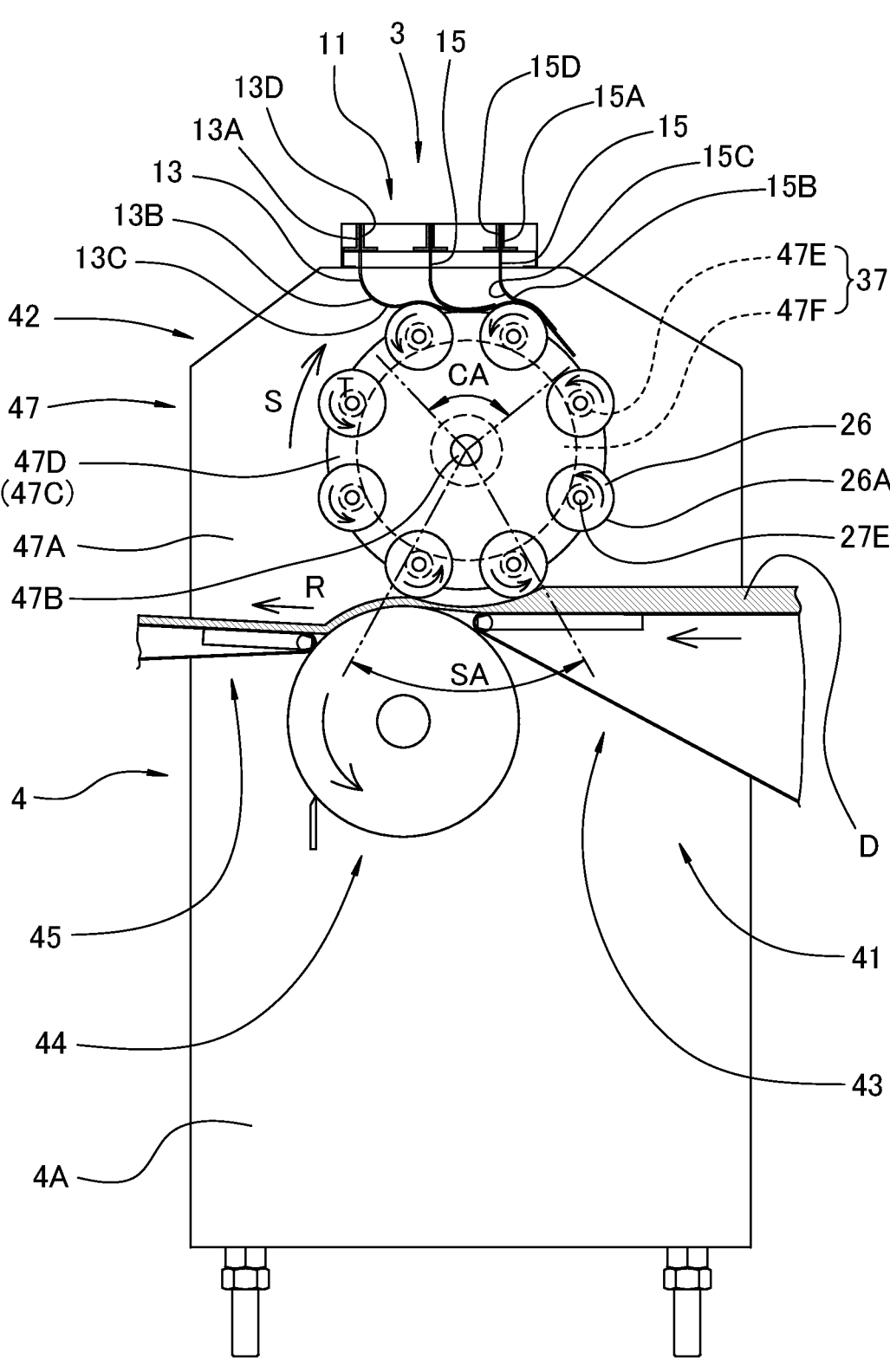
FIG. 4 is a schematic front cross-sectional view of a dough extension apparatus including a cleaning device according to a second embodiment of the present invention.

As shown in FIG. 4, the dough extension apparatus 4 includes a base frame 4A, a conveying device 41 attached to the base frame 4A, and an extending device 42 disposed above the conveying device 41.

The conveying device 41 includes a first conveyor 43, a large diameter roller 44 disposed downstream of and adjacent to the first conveyor 43, and a second conveyor 45 disposed downstream of and adjacent to the roller 44.

The extending device 42 includes a plurality of extension rollers 26 and an extension roller driving device 47 that allows the plurality of extension rollers 26 to be circulated (moved) along an endless circular trajectory in an arrow direction S shown in FIG. 4. The extension roller driving device 47 includes a pair of frames 47A, a driving shaft 47B, a pair of roller bases 47C, 47D, a plurality of extension roller shafts 27E, and a driving motor (not shown). The extension roller 26 and the extension roller shaft 27E are integrally fixed. The pair of frames 47A is disposed above the frame 4A on left and right sides of the conveying device 41.

The pair of frames 47A is configured to rotatably support the driving shaft 47B inside of the pair of frames 47A (between opposite frames 47A), and the driving shaft 47B is inserted (passed) into and secured to the pair of roller bases 47C, 47D. The pair of roller bases 47C, 47D is configured to rotatably support the eight extension roller shafts 27E at equal intervals in a peripheral direction. Eight gears 47E are secured (fitted) to ends of the respective extension roller shafts 27E on a side of the roller base 47D and mated with a gear 47F concentrically and rotatably attached to the driving shaft 47B. There are a first driving motor for driving the driving shaft 47B and a second driving motor for driving the gear 47F so that the extension rollers 26 are rotated (on their own axes) in the arrow direction T while the extension rollers 26 are circulated (moved) along the circular trajectory in the arrow direction S shown in FIG. 4.

Each of the plurality of extension rollers 26 is configured to extend the dough between the extension roller 26 and opposed surfaces of the conveying device 41 when the extension roller 26 is moved along a lower area of the circular trajectory (extending area SA), and is configured to clean adhering material W adhering to the surface 26A of the extension roller 26 by the cleaning device 3 when the extension roller 26 is moved along an upper area of the circular trajectory (cleaning area CA).

The cleaning device 3 is disposed at an upper portion of the dough extension apparatus 4 and includes a cleaning device body 11, a cleaning member 13, a biasing member 15, and an extension roller rotating device 37.

Since configurations of the cleaning device body 11, the cleaning member 13, and the biasing member 15 are approximately the same as those of the cleaning device 1 according to the first embodiment, explanation of such configurations is omitted. In the present embodiment, the extension roller rotating device 37 is composed (combined) of the gears 47E and 47F described above and the second driving motor for driving the gear 47F. It is possible to adjust a rotational speed of the extension roller 26 by controlling the rotational speed of the first driving motor that circulates (revolves) the extension rollers 26 along the circular trajectory and the rotational speed of the second driving motor that rotates the extension roller 26 (on its own axis), namely, by controlling the difference between the rotational speeds of these two driving motors.

Since an operation of the second embodiment is substantially the same as that of the first embodiment, detailed explanation of the operation of the second embodiment is omitted. Since the cleaning member 13 and the biasing member 15 are flexible, they can be deformed to correspond to the surface 26A of the extension roller 26 which is circulated (moved) along the circular trajectory, so that the cleaning surface 13C can clean the surface 26A of the extension roller 26 over its entire circumference.

Figure 5:
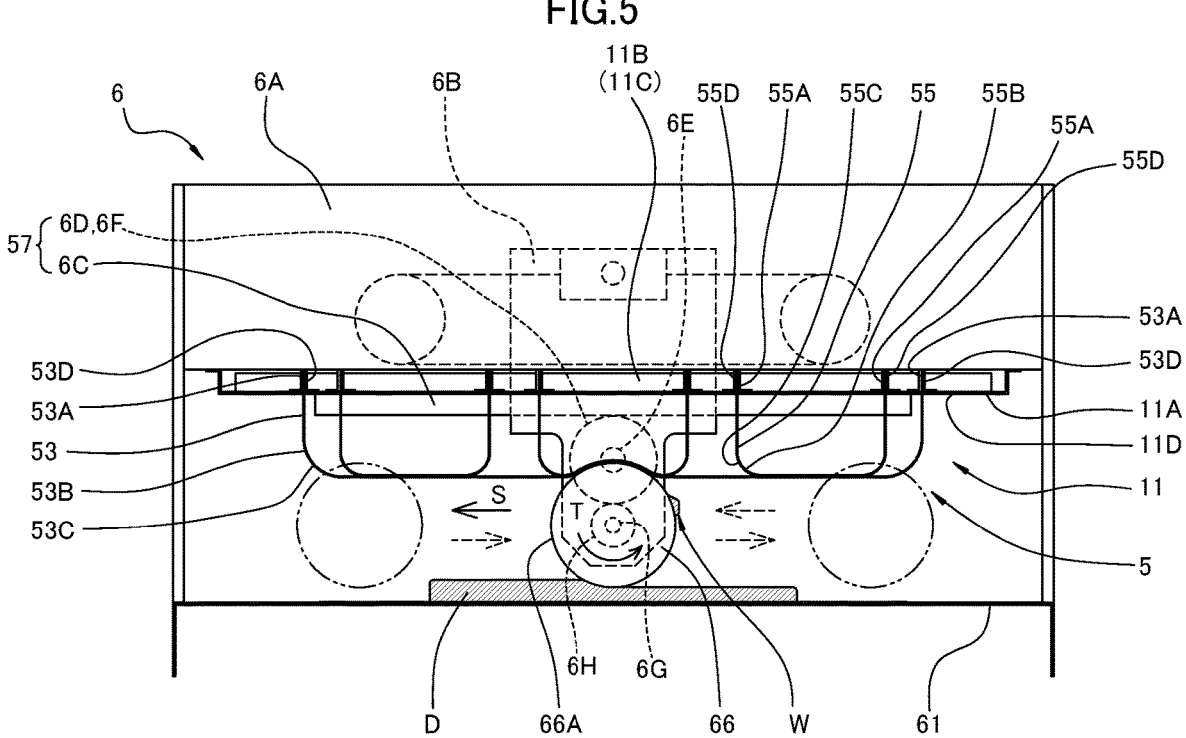
FIG. 5 is a schematic cross-sectional view of a dough extension apparatus including a cleaning device according to a third embodiment of the present invention as viewed from the upstream side in a conveying direction of the dough.

Next, referring to FIG. 5, a cleaning device 5 according to a third embodiment of the present invention will be explained. The same reference numbers or characters as those of the components previously explained will be attached to components of the third embodiment which are the same as those previously explained, and duplicate explanation therefor is omitted. FIG. 5 is a cross-sectional view of a dough extension apparatus 6 viewed from an upstream side in the conveying direction. The cleaning device 5 is configured to clean adhering material W adhering to a surface 66A of an extension roller 66 in the dough extension apparatus 6 extending the food dough D. In the dough extension apparatus 2 in the first embodiment, the extension rollers 26 are circulated along an oval trajectory, while in the dough extension apparatus 6 of the present embodiment, an extension roller 66 is reciprocated (moved) along a straight trajectory extending in a width direction perpendicular to the conveying direction.

As shown in FIG. 5, the dough extension apparatus 6 has a frame 6A extending in the width direction above a conveying device 61. The dough extension apparatus 6 includes a slider 6B, a rack gear 6C, and a pinion gear 6D, each disposed inside of the frame 6A, and is configured to reciprocate the slider 6B at a predetermined distance by a driving transmission mechanism such as a driving motor and chains (not shown). The rack gear 6C is secured to the frame 6A. The pinion gear 6D is secured to (inserted into) an upper shaft GE supported rotatably by the slider 6B and is mated with the rack gear 6C. An idler gear 6F is secured to (inserted into) the upper shaft 6E. The extension roller 66 is disposed at a lower portion of the slider 6B and secured to (inserted into) a lower shaft 6G rotatably supported by the slider 6B. A gear 6H secured to (fitted into) the lower shaft 6G and mated with the idler gear 6F. Thus, when the slider 6B is reciprocated in the width direction by the driving motor, the extension roller 66 is configured to be alternately rotated on its own axis in a right rotational direction and in a left rotational direction while it is reciprocated integrally with the slider 6B.

The cleaning device 6 is disposed in the dough extension apparatus 6 and includes the cleaning device body 11, a cleaning member 53, three biasing members 55, and an extension roller rotating device 57.

The base 11A of the cleaning device body 11 is a plate like member disposed on a lower surface of the frame 6A and has (is formed with) at its center a rectangular aperture 11D. Side plates 11B, 11C are plate-like members disposed parallel to each other and extending along the width direction on an upper surface of the base 11A.

The cleaning member 53 is a band-like (sheet-like) member similar to the cleaning member 13 in the first embodiment, but in this embodiment, opposite ends 53A of the cleaning member 53 are secured to a plate 53D. The plate 53D has the same configuration as that of the plate 13D in the first embodiment and is easily and detachably secured to the pair of side plates 11B, 11C. Namely, the opposite ends 53A of the band-like cleaning member 53 are detachably secured to the cleaning device body 11 via the plate 53D, a cleaning portion 53B between the opposite ends 53A hangs down through the rectangular aperture 11D of the base 11A, and a cleaning surface 53C of the cleaning portion 53B is configured to contact an upper part of a surface 66A of the extension roller 66, so that the surface 66A of the extension roller 66 can be cleaned.

The three biasing members 55 are disposed along the width direction inside of the cleaning member 53 which hangs down. The biasing members 55 are similar to the biasing member 15 in the first embodiment, but in this embodiment, opposite ends 55A of the biasing member 55 are secured to a plate 55D and are secured to the pair of side plates 11B, 11C in the same manner as that of the cleaning member 53 for being easily attached and detached. Thus, in the present embodiment, a biasing portion 55B of the biasing member 55 is in a state of being bent downwardly and hanging, and a biasing surface 55C of the biasing portion 55B contacts the surface (back side) opposite from the cleaning surface 53C, so that the cleaning portion 53B is pressed against the surface 66A of the extension roller 66. Namely, the opposite ends 55A of the biasing member 55 are detachably secured to the cleaning device body 11 via the plate 55D, and the biasing portion 55B hangs down to bias the cleaning portion 53B from its back side, so that the cleaning surface 53C is configured to be pressed against the surface 66A of the extension roller 66. In the present embodiment, the extension roller rotating device 57 is defined by (employed as) the rack gear 6C, the pinion gear 6D and the driving motor driving them.

Next, an operation of the third embodiment will be explained. Continuous food dough D is conveyed to the dough extension apparatus 6 from a dough feeding apparatus (not shown) disposed on an upstream side of the dough extension apparatus 6. The food dough D is extended between the extension roller 66 reciprocated in the width direction and the opposite surfaces of the conveying device 61, and conveyed to a forming apparatus (not shown) disposed on a downstream side. Then, when the extension roller 66 is rotating while reciprocating in the straight trajectory, the cleaning device 5 cleans the adhering material W adhering to the surface 66A of the extension roller 66. Since the opposite ends 53A of the cleaning member 53 are secured to the cleaning device body 11, even when the extension roller 66 is moving in either direction, the cleaning member 53 is deformed or bent to correspond to the surface 66A of the extension roller 66 without falling off, and the cleaning surface 53C surface-contact the surface 66A. The extension roller 66 moves in the width direction (arrow direction S) while rotating in the arrow direction T shown in FIG. 5. Namely, the surface 66A is rotated and moved to slide on and surface-contact the cleaning surface 53C, so that the cleaning surface 53C can clean the entire circumference of the surface 66A. Further, the cleaning member 53 is biased from its back side by the biasing member 55 against the extension roller 66 to be strongly pressed against the surface 66A, so that the adhering material can be efficiently cleaned over the entire circumference of the surface 66A.

Next, referring to FIG. 6, a cleaning device 7 according to a fourth embodiment of the present invention and a dough extension apparatus 8 including the cleaning device 7 will be explained. The same reference numbers or characters as those of the components previously explained will be attached to components of the cleaning device 7 which are the same as those previously explained, and duplicate explanation therefor is omitted. The cleaning device 7 is configured to clean adhering material W adhering to a surface 86A of an extension roller 86 in the dough extension apparatus 8 extending food dough D.

Figure 6A:
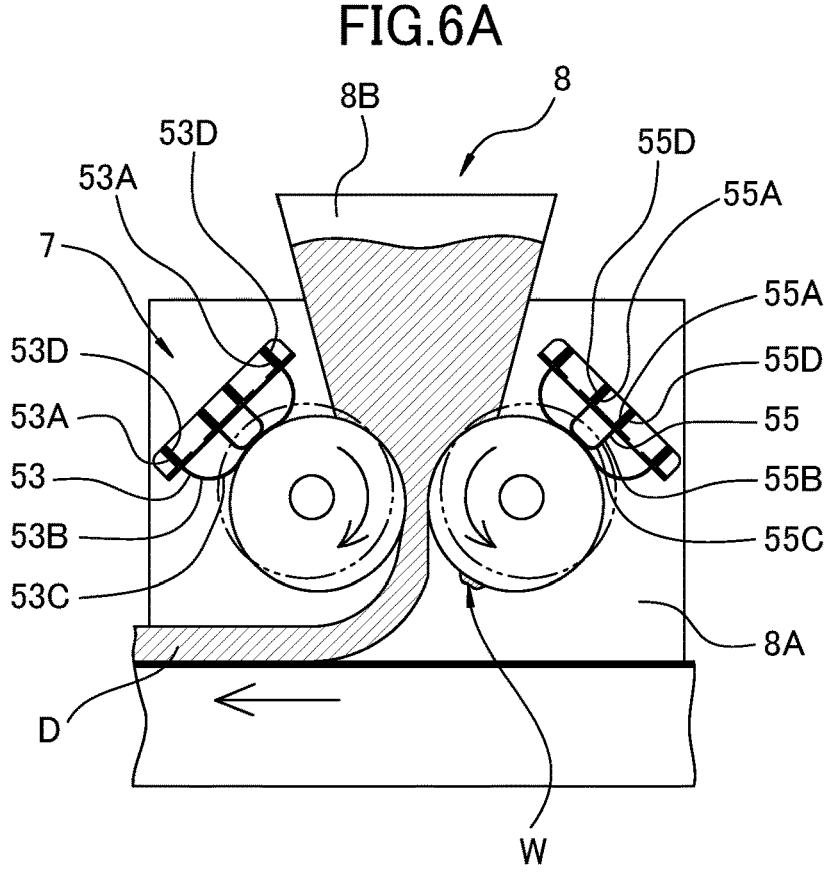
FIG. 6A is a schematic front cross-sectional view of a dough extension apparatus including a cleaning device according to a fourth embodiment of the present invention.
Figure 6B:
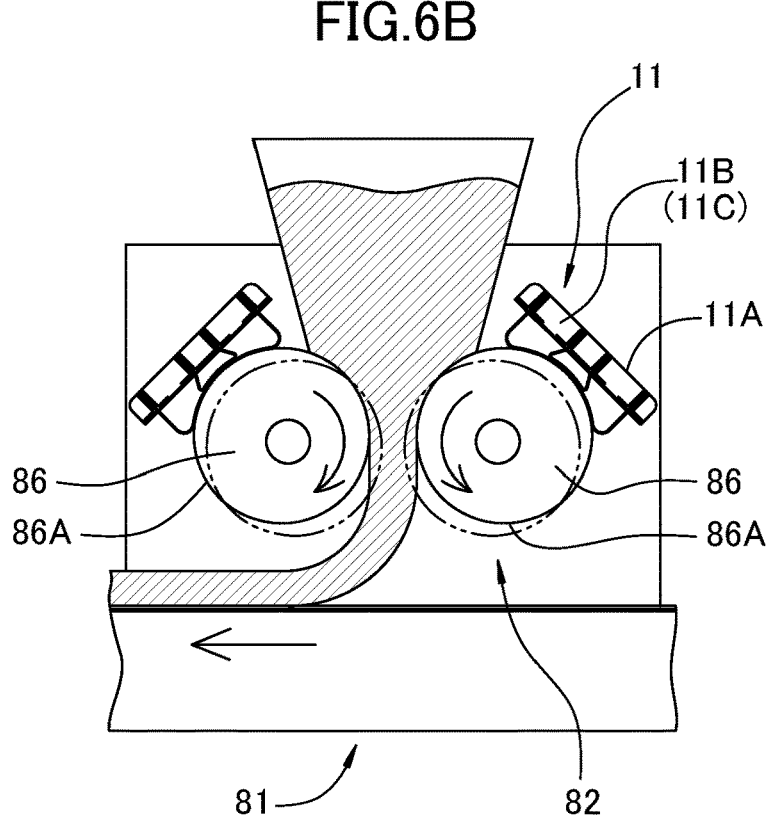
FIG. 6B is a schematic front cross-sectional view of the dough extension apparatus including the cleaning device according to the fourth embodiment of the present invention.

As shown in FIG. 6, the dough extension apparatus 8 is configured to extend the food dough D flowing down from a hopper 8B and convey the food dough D to a downstream side by a conveying device 81 disposed at a lower portion of the dough extension apparatus 8, and includes a base frame 8A, a conveying device 81, and an extending device 82.

The extending device 82 includes a pair of extension rollers 86, and each of the extension rollers 86 is an eccentric roller, which is eccentric to its rotating shaft. The paired extension rollers 86 are disposed parallel to each other at a predetermined gap, a phase of eccentric directions of the extension rollers 86 is 180 degrees, and the extension rollers 86 are configured to be rotated in opposite directions with each other by a driving motor (not shown). Thus, when the extension roller 86 is rotated, the gap between the paired extension rollers 86 repeatedly increases and decreases.

The cleaning device 7 is disposed diagonally above the extension roller 86, and includes a cleaning device body 11, a cleaning member 53, and a biasing member 55. The cleaning device body 11 includes a base 11A and a pair of side plates 11B, 11C. The base 11A holds the plate-like side plates 11B, 11C so that the side plates 11B, 11C are disposed parallel to each other. Since components of the cleaning member 53 and the biasing member 55 are similar to those in the third embodiment, explanation of them is omitted.

Next, an operation of the fourth embodiment will be explained. The food dough D is supplied from the hopper 8B to the extending device 82, extended between the paired extension rollers 86, and discharged by the conveying device 81 to the downstream forming device (not shown). Since the extension roller 86 is eccentric with respect to a rotational axis, a radius of the surface 86A of the extension roller 86 contacting the food dough D is constantly varied from the rotational axis. The cleaning portion 53B of the cleaning member 53 is deformed to corresponding to the variation of the surface 86A of the extension roller 86, so that the surface-contact between the cleaning surface 53C and the surface 86A is maintained and adhering material W adhering to the surface 86A of the extension roller 86 can be cleaned. Further, since the cleaning member 53 is biased from its back side by the biasing member 55 against the extension roller 86, the cleaning member 53 is strongly pressed against the surface 86A of the extension roller 86, so that the adhering material can be efficiently cleaned over the entire circumference of the surface 86A of the extension roller 86.

Figures 7A, 7B:
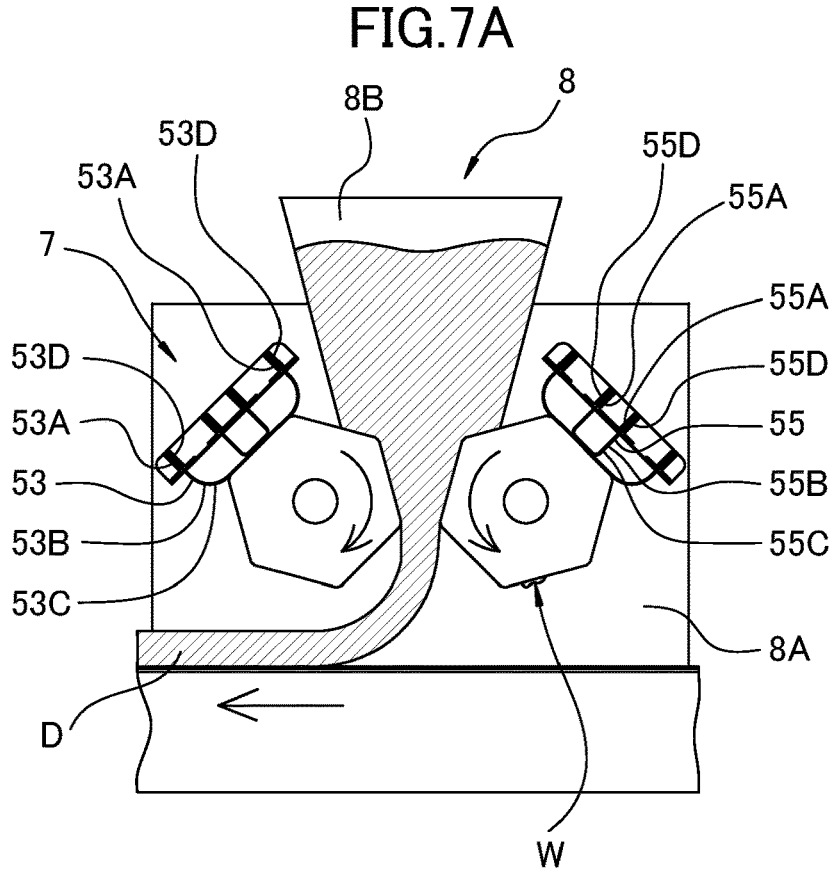
FIG. 7A is a schematic front cross-sectional view of the dough extension apparatus including an alternative of the cleaning device according to the fourth embodiment of the present invention.
FIG. 7B is a schematic front cross-sectional view of the dough extension apparatus including an alternative of the cleaning device according to the fourth embodiment of the present invention.

As an alternative of this embodiment, instead of the extension roller 86, as shown in FIG. 7, an extension roller 96 which is concentric with the rotating axis and has a polygonal surface may be used. Even in this alternative, the cleaning portion 53B of the cleaning member 53 is deformed to corresponding to the variation of a surface 96A of the extension roller 96, so that surface-contact between the cleaning surface 53C and the surface 96A is maintained and adhering material W adhering to the surface 96A of the extension roller 96 can be cleaned. Further, even if the extension roller is an elliptical roller or a roller with a wavy surface, it is possible to maintain surface-contact between the cleaning surface and the surface of the extension roller and to clean adhering material on the surface of the extension roller by appropriately selecting the material of the cleaning member.

Although the forming apparatuses according to the embodiments of the present invention have been schematically explained, the present invention is not limited to these embodiments, namely, various modifications can be made according to the recitation in the claims, and it goes without saying that such modifications are also included within the scope of the present invention.

In the above-stated embodiments, the circulating trajectory of the extension roller is the oval trajectory or the circular trajectory, but the circulating trajectory of the extension roller may be, for example, a triangular or elliptical circulating trajectory. Even in these trajectories, the cleaning member surface-contacts the extension roller to correspond to the surface of the extension roller, so that the surface of the extension roller can be cleaned.

Figure 8:
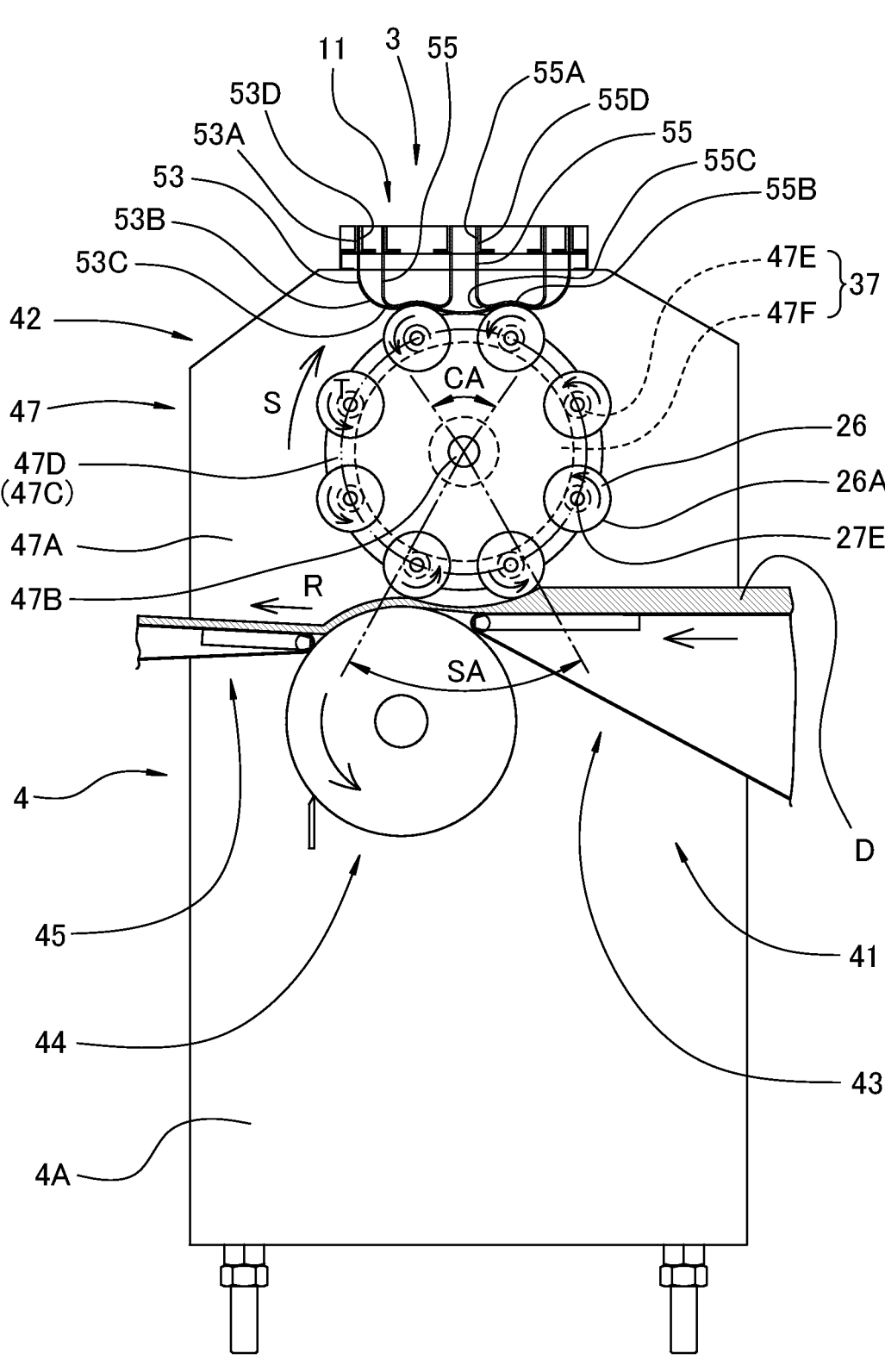
FIG. 8 is a schematic front view of a dough extension apparatus including an alternative of the cleaning device according to the second embodiment of the present invention.

As an alternative of the cleaning device according to the second embodiment, a configuration may be employed, in which both ends 53A of a cleaning member 53 are detachably secured to the cleaning device body 11 as shown in FIG. 8. With such a configuration, it is possible to clean adhering material on the surface 26A of the extension roller 26 regardless of the direction in which the extension roller 26 circulates (moves) and/or rotates (on its own axis).

1, 3, 5, 7: cleaning device
2, 4, 6, 8: dough extension apparatus
11: cleaning device body
13, 53: cleaning member
13A, 53A: end
13B, 53B: cleaning portion
13C, 53C: cleaning surface
15, 56: biasing member
17, 37, 57: extension roller rotating device
26, 66, 86, 96: extension roller
26A, 66A, 86A, 96A: surface
D: food dough

What is claimed:

1. A dough extension apparatus, comprising:
an extension roller having a curved cylindrical surface and adapted to be circulated along a circulating trajectory or reciprocated along a predetermined trajectory;
a cleaning device body attached to the dough extension apparatus and adapted to clean a surface of the extension roller, the cleaning device body comprising:
a cleaning member comprising a flexible sheet of material having a first end and a second end and having a cleaning portion with a cleaning surface configured and adapted to clean material from the extension roller, the cleaning member extending downward in a direction from the first end to the second end;
the cleaning member secured in a first position with respect to the cleaning device body;
wherein the cleaning surface contacts the curved cylindrical surface of the extension roller at a cleaning area, the cleaning area being a portion of the circulating trajectory or the predetermined trajectory;
wherein, the first end is above the second end and the cleaning portion of the flexible sheet of material hangs downwards, and the cleaning surface of the cleaning portion is deformed and bent to conform to the curved cylindrical surface of the extension roller when the cleaning surface surface-contacts the curved cylindrical surface of the extension roller;
and the cleaning device further comprises an extension roller rotating device adapted to rotate the extension roller around its own axis in the cleaning area;
wherein the surface of the extension roller is positioned to slide against the cleaning surface.

2. The dough extension apparatus according to claim 1, wherein the cleaning device further comprises: a biasing member for biasing the cleaning member from the opposite side of the cleaning surface to press the cleaning surface against the surface of the extension roller.

3. The dough extension apparatus according to claim 1, wherein the cleaning member is detachably secured to the cleaning device body.

4. The dough extension apparatus according to claim 1, wherein the cleaning surface has a concave-convex feature.

* * * * *